Patented June 28, 1949

2,474,787

UNITED STATES PATENT OFFICE 2,474,787

ARC WELDING COMPOSITION AND METHOD OF MAKING SAME

George G. Landis, South Euclid, and Vladimir Peters, Lakewood, Ohio, assignors to The Lincoln Electric Company, Cleveland, Ohio, a corporation of Ohio No Drawing. Application September 24, 1948, Serial No. 51,118

14 Claims. (Cl. 148—24)

The present improvements relate generally to welding compositions or fluxing materials designed to be placed on the work in the course of an arc welding operation in order to provide a protective blanket over the pool of molten metal which results from such operation. More particularly, such improvements have to do with a composition or material designed for use in so-called deep flux welding, i. e. an arc welding process in which an arc is maintained between a metallic electrode and the work, the arc and the deposited weld metal being protected from the atmosphere by a layer of powdered or granular material deposited on the work to a depth sufficient to submerge the arc as the latter is caused to traverse the line or seam to be welded.

The use of such deep flux layer in arc welding has been known and practiced for a number of years past (see Patent No. 1,782,316 to B. S. Robinoff et al., dated November 18, 1930, and article entitled "New pipe mill at McKeesport Works of National Tube Company," The Iron Age, May 17, 1931, pp. 1502 et seq.). However, despite certain well recognized advantages of such procedure, a great deal of difficulty has been experienced in finding a flux composition that will perform satisfactorily therein under all conditions, as evidenced by the considerable number of patents taken out during the past decade on such compositions.

Actually, there is reason to believe that the problem is not so much one of the chemical composition of the flux since a considerable number of such compositions have been found capable of serving the fundamental requirements which are to keep the air from the molten weld metal and not contaminate such metal by introducing unwanted elements. However, where designed for use in the form of a layer deposited along the line to be welded in which layer the arc is to be submerged, other factors more or less physical in character are important. Thus, if as is ordinarily the practice the flux is deposited from a hopper or the like, it should be free-flowing so as not to clog the outlet of such feeding device and should form a windrow of desired depth without necessarily being laterally confined. Such free-flowing character is also important in order to insure that as the welding electrode is moved into and along the deposited layer or windrow of flux the furrow produced by such movement will promptly close instead of remaining open as will be the case if the flux is of such form as to have a steep angle of repose.

Heretofore, the most satisfactory performance in deep flux or submerged arc welding has been obtained by the use of pre-fused granular fluxes which usually consist of metallic silicates selected from the group of manganese, calcium, magnesium and aluminum silicates, such pre-fused silicates being ground to a particle size which will have the free-flowing character just described. A further advantage accomplished in such pre-fused flux compositions is that the components, including certain ingredients that are desirably added in minor amounts, such as a metallic fluoride, will be uniformly distributed, since in this way the tendency for particles of different composition to segregate when deposited in the manner described is eliminated.

We have now discovered that a highly satisfactory flux composition suitable for use in deep flux or submerged arc welding in the manner described may be produced without thus subjecting the ingredients to pre-fusion and subsequent grinding of the resulting highly refractory product, both of which are expensive operations. Instead, we have found that it is entirely practicable to obtain a flux composition which has the desirable free-flowing and other characteritics by intermixing selected known flux ingredients in finely comminuted or powdered form together with a sufficient amount of water glass, i. e. sodium and/or potassium silicate, containing a sufficient amount of water to be liquid. The amount of water glass also added will be the minimum required to bind together or agglomerate the other ingredients, the essential requirement being that all of the ingredients are uniformly distributed throughout such mass. Thereupon, the latter is dried, at a temperature substantially below the fusion point of the ingredients, so as to drive off the water introduced through the medium of the water glass or otherwise, and the resulting product is then reduced, as by grinding, to the desired particle size. Such grinding operation will not be particularly difficult since the dried product thus obtained is considerably more easily ground than the pre-fused silicate compositions currently in use. In fact, all that is required is to pass the material through sizing rolls whereby the agglomerated, nodular mass may be broken down with a minimum production of fines.

The following description sets forth in detail certain products and methods for making the same which exemplify the present improvements;

such disclosed products and procedures for making the same constitute, however, but several of the various applications of the principle of the invention.

For example, a highly satisfactory flux composition of the type in question has been obtained by intermixing in a dry, finely ground state, 39% roasted manganese ore, 39% silica, 3% fluorspar (calcium fluoride), and 4% silico manganese (ferro manganese may be substituted in part); then adding to and intermixing with such mixture 15% of sodium silicate solution of approximately 47° Beaumé; following which the whole is dried at a suitable temperature, and the resulting agglomerated mass crushed to 12 x 12 mesh. The drying is preferably carried to the point where the water content is reduced to ½% or less.

The particles, whereof the final product is constituted, are substantially larger than the finely ground entering ingredients. However, as a result of the method of manufacture employed, each such particle will comprise a uniformly distributed mixture of the finely ground ingredients bound together by the dry water glass.

The composition of such particles in their final dry state where made according to the formula just set forth, will by calculation be approximately as follows:

| | Per cent |
|---|---|
| Roasted manganese ore | 42.6 |
| Silica | 42.6 |
| Fluorspar | 3.3 |
| Silico-manganese | 4.4 |
| Sodium silicate (anhydrous) | 7.1 |

The manganese ore employed is a naturally occurring mineral, which consists in major proportion of manganese dioxide, together with small amounts of other compounds, e. g. silica, pyrite, etc., as impurities. The object of the roasting is to reduce the available oxygen, as well as whatever sulphur or sulphur compounds, e. g. pyrite, may be found present in such ore. In place of manganese ore, treated in the manner described, we may employ an equivalent amount of commercial manganese oxide, it being understood that this term connotes either the monoxide or dioxide, or a mixture of the two.

The silica used is a high-grade relatively pure silica sand, and where the ore used contains a consequential amount of silica, the amount of the latter thus added will be correspondingly reduced. For example, if the ore contains 9% of silica, the above formula would require 48% ore and 30% silica.

In place of the fluorspar, other metallic fluorides such as aluminum fluoride, sodium aluminum fluoride, or sodium fluoride may be employed. It is also satisfactory for certain applications to omit such fluoride entirely.

The sodium silicate solution, commercially known as water glass, may contain or consist of potassium silicate. The amount thereof and particularly of the sodium or potassium constituents will be held to the minimum required to bind the other ingredients together, first in the initial moist stage and then in the final dried form thereof. Since water itself acts to a certain extent as a binder in the moist condition of the mass, the water glass may be made more or less dilute, keeping in mind that the more water employed, the more heat will have to be employed to drive it off.

The temperature employed in thus driving off the water may vary, with a corresponding variation in the time factor, so long as it is held substantially below that at which fusion of the manganese oxide and silica will occur. In other words, no attempt is made to sinter the mixture, much less to form a synthetic manganese silicate of these components, but merely to bind together the fine particles comprising the mixture into a uniform conglomerate mixture, in which the dried water glass serves as the binding agent. It has been found that this result is satisfactorily obtained, and within a reasonable time, where a temperature of 700° F. is employed, although it may be carried as high as 1200° F., and a temperature lower than 700° F. will suffice but require a longer drying period.

The silico manganese or ferro manganese, included in the example set forth above, is what is known as a "killing agent" in steel making and the amount thereof may be slightly more or less than the 4% indicated by the foregoing formula. Also other similar alloys may be utilized. Thus, as indicated in the formula which will next be described, 1% of ferro silicon which is a similar "killing agent" has been found satisfactory. Depending upon the particular ingredient selected as such agent, and other conditions, the amount thereof incorporated in the mixture may range from 1% to 6%. Metallic aluminum in finely ground state may also be used. It has always been found impractical to retain agents of this type in silicate fluxes formed by pre-fusing the constituent metallic oxide and silica, inasmuch as the temperature required to effect pre-fusion and combination of ingredients, either drives off or changes the character of the agent. For this reason, it has been found necessary to employ with certain of such prefused silicate fluxes a special alloy weldrod or filler wire, in order to obtain satisfactory welds.

The metallic fluoride, at the temperature required to form such prefused silicate fluxes, also tends to form volatile fluoride compounds with a result that only a fraction of the amount of this ingredient initially included will remain in the finished product. It is also impossible to retain metallic aluminum in such prefused type of flux.

While in the example given above, the ratio of silica to manganese oxide is greater than the ratio present in manganese silicate, i. e. there is a substantial excess of silica, a composition made in the same manner, but with the manganese oxide and silica present in stoichiometric proportions, as taught by Patent No. 1,754,566 to W. B. Miller, dated April 15, 1930, has also been found satisfactory. By way of example, such modified composition may be made by intermixing in a dry, finely ground state, manganese oxide and silica in the proportion stated, together with approximately the same amount of fluorspar as before, and, if desired, with approximately the same amount of a killing agent; then adding to such mixture water glass in approximately the same amount as before, with the succeeding steps exactly the same.

As a further example, instead of utilizing manganese oxide and silica separately in the ratio in which they are found present in manganese silicate, they may be used in combined form, i. e. as preformed manganese silicate as also taught by the above-mentioned patent to Miller. In such case, the preformed manganese silicate may be either the naturally occurring ore or may be formed from the manganese oxide and silica by fusing the same together, or be similarly formed by a precipitation process. In any event, in accordance with the present invention, such preformed manganese silicate in finely ground condition is mixed with the other minor ingredients and thereupon treated in exactly the same manner as in the case of Example 1 above.

Still another example is the following in which a portion of the manganese oxide is replaced by iron oxide and alumina, viz. 8.6% iron oxide (mill scale), 17.7% manganese dioxide, 8.6% alumina and 39.5% silica are intermixed in dry, finely ground state, together with 3.0% of fluorspar and 1% ferro-silicon as a killing agent; then 21.6% of sodium silicate solution is added, the whole mixed, dried and crushed as before.

The composition of the resulting particles in their final dry state will by calculation be approximately as follows:

| | Per cent |
|---|---|
| Manganese dioxide | 20.3 |
| Iron oxide | 9.8 |
| Alumina | 9.8 |
| Silica | 45.0 |
| Fluorspar | 3.4 |
| Ferro-silicon | 1.1 |
| Sodium silicate (anhydrous) | 10.6 |

The foregoing example represents, in effect, an improvement in the arc welding material disclosed in Patent No. 2,360,716 dated October 17, 1944, to Vladimir Peters, one of the present inventors, such material comprising an unfused mixture of silica sand in predominant amount and smaller amounts of a fluoride, a metallic oxide capable of acting as an oxidizer at arc welding temperatures, and a deoxidizer. As defined in the patent such "oxidizer" may be either manganese oxide or iron oxide, or both, while the "deoxidizer" may be selected from the class consisting of silico-manganese, ferro-manganese and ferro-silicon.

Our present invention resides, among other things, in the discovery that by agglomerating the intermixed ingredients of such previously patented material and further treating the same as hereinabove set forth, a greatly improved composition is obtained. Not only does it have the free-flowing and other physical characteristics pointed out as desirable, but as a comparison of formulas will show, the amount both of fluoride and deoxidizer or killing agent required is considerably less.

Just as a portion of the manganese oxide in the first given example may be replaced by iron oxide and alumina, so a portion of such manganese oxide may be replaced by calcium oxide, i. e. lime, or by the equivalent amount of calcium carbonate, i. e. limestone, or of dolomite or calcium-magnesium carbonate. Also rutile, i. e. titanium oxide, may replace a portion of such manganese oxide.

Also, instead of the main content or major proportion of the composition being composed of manganese, or other metallic oxide, and silica, as in the several previously given examples, such body may consist of naturally occurring silicates such as have been long known and used in weld rod coatings. Thus ordinary asbestos, which is principally magnesium silicate, or blue asbestos, which is principally ferrous silicate, or clay, which is principally aluminum silicate, or nephelite, which is principally sodium potassium aluminum silicate, may be thus used to form the present improved flux composition. Such silicates in finely ground condition will be intermixed with fluorspar or other metallic fluoride, and with silico-manganese or other equivalent killing agent in approximately the amounts given in previous examples; then a minimum amount of water glass to bind the other ingredients together is added and after thorough intermixture the resulting mass is dried and reduced to the form of granular free-flowing particles.

It will be understood that in the last preceding example a synthetic silicate, or mixture of silicates, such as acid open hearth slag, or Portland cement, may be substituted for the naturally occurring silicates.

The water glass employed in all of the examples is commercial water glass which, as indicated, ordinarily consists of sodium silicate in water solution, although potassium silicate may be substituted in whole or in part for the sodium silicate. One specific composition of water glass which has been found satisfactory in the several above given examples or formulas has a ratio of silica to sodium oxide of 2.85, and enough water to give a Beaumé of 47.35° at 60° F. As indicated, it is desirable to use just as little alkali metal (sodium or potassium) oxide as possible, since too much of such metal may, among other things, have the effect of unduly increasing the length of the arc. On the other hand, as previously indicated, it has been found possible by binding together or agglomerating the ingredients with water glass to incorporate in the composition any desired amount of a killing agent, something which is incapable of achievement in the fused type of flux composition. Furthermore, since the composition is not subjected to a temperature which will drive off any of the fluoride added, there is no interaction of the latter with the other ingredients nor consequent waste of this relatively expensive ingredient, nor the nuisance encountered in the manufacture of fused flux compositions because of the fluoride fumes that are given off at higher temperatures.

In addition to the foregoing advantages, our present improved flux, particularly when comprising a major proportion of manganese oxide and silica, has a much greater volume to weight ratio than a corresponding composition wherein the ingredients are prefused together. Thus the volume per pound may be 50 per cent greater in the case of the former compared with the latter. This increases correspondingly the covering ability of our improved composition, since that much less in weight of materials used is required to weld a given length of seam. The cost may in fact be reduced to the point where recovery of the composition for reuse offers no saving over using fresh, uncontaminated material.

It will be understood that when we refer to the arc as being submerged in the layer of flux or welding composition, this does not mean complete submergence; i. e. that the arc should be entirely hidden from view. While the latter condition may relieve the operator from using dark glasses or other eye shield, the welding operation is just as satisfactory where the arc is exposed, provided the deposited layer of flux composition is deep enough to provide adequate protection for the molten metal produced by such operation.

While, as indicated, the finished products need be crushed only to 12 x 120 mesh, the entering solid ingredients should be relatively finely ground. We have used 20 to 200 mesh, but have found 40 mesh a satisfactory screen size for such ingredients.

Other modes of applying the principle of the invention may be employed, change being made as regards the details described, provided the features stated in any of the following claims, or the equivalent of such, be employed.

We therefore particularly point out and distinctly claim as our invention:

1. A flux composition for use in arc welding when deposited as a layer along the line to be welded, such composition being in the form of granular, free flowing particles composed essentially of a major part of finely ground flux ingredients selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica, such silica and other components being in approximately combining ratio, and a minor part of a binder consisting of substantially anhydrous water glass, the amount of such binder being approximately the minimum required, when in such anhydrous condition, to agglomerate said flux ingredients in uniformly distributed condition into such particles.

2. A flux composition for use in arc welding when deposited as a layer along the line to be welded, such composition being in the form of granular, free flowing particles composed essentially of a major part of finely ground flux ingredients selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica, such silica and other components being in approximately combining ratio, and including a relatively small amount of a killing agent, and a minor part of a binder consisting of substantially anhydrous water glass, the amount of such binder being approximately the minimum required when in such anhydrous condition to agglomerate said flux ingredients in uniformly distributed condition into such particles.

3. A flux composition for use in arc welding when deposited as a layer along the line to be welded, such composition being in the form of granular, free flowing particles composed essentially of a major part of finely ground flux ingredients selected from the class consisting of manganese, calcium, magnesium and aluminum silicates and of silicate forming components, namely manganese oxide and silica and calcium aluminum, titanium and iron oxides and calcium and calcium magnesium carbonates together with manganese oxide and silica, such silica and other components being in approximately combining ratio, and including a relatively small amount of a metallic fluoride selected from the class consisting of calcium, sodium and aluminum fluorides, and a minor part of a binder consisting of substantially anhydrous water glass, the amount of such binder being approximately the minimum required, when in such anhydrous condition, to agglomerate said flux ingredients in uniformly distributed condition into such particles.

4. A flux composition for use in arc welding when deposited as a layer along the line to be welded, such composition being in the form of granular, free flowing particles composed essentially of a major part of finely ground flux ingredients selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica, such silica and other components being in approximately combining ratio, and including a relatively small amount each of a killing agent and of a metallic fluoride selected from the class consisting of calcium, sodium and aluminum fluorides, and a minor part of a binder consisting of substantially anhydrous water glass, the amount of such binder being approximately the minimum required, when in such anhydrous condition, to agglomerate said flux and other ingredients in uniformly distributed condition into such particles.

5. A flux composition suitable for use in arc welding when deposited as a layer along the line to be welded, such composition being in the form of granular, free flowing particles composed essentially of a major part of finely ground manganese oxide and silica in approximately the combining ratio to form manganese silicate, and a minor part of a binder consisting of substantially anhydrous water glass, the amount of such binder being approximately the minimum required, when in such anhydrous condition, to agglomerate said flux ingredients in uniformly distributed condition into such particles.

6. A flux composition suitable for use in arc welding when deposited as a layer along the line to be welded, such composition being in the form of granular, free flowing particles composed essentially of a major part of finely ground manganese oxide and silica in approximately the combining ratio to form manganese silicate and including a relatively small amount of a killing agent, and a minor part of a binder consisting of substantially anhydrous water glass, the amount of such binder being approximately the minimum required, when in such anhydrous condition, to agglomerate said flux ingredients in uniformly distributed condition into such particles.

7. A flux composition suitable for use in arc welding when deposited as a layer along the line to be welded, such composition being in the form of granular, free flowing particles composed essentially of a major part of finely ground manganese oxide and silica in approximately the combining ratio to form manganese silicate and including a relatively small amount of a metallic fluoride selected from the class consisting of calcium, sodium and aluminum fluorides, and a minor part of a binder consisting of substantially anhydrous water glass, the amount of such binder being approximately the minimum required, when in such anhydrous condition, to agglomerate said flux ingredients in uniformly distributed condition into such particles.

8. A flux composition suitable for use in arc welding when deposited as a layer along the line to be welded, such composition being in the form of granular free flowing particles comprising the following ingredients in approximately the indicated percentages, viz.:

| | Per cent |
|---|---|
| Roasted manganese ore | 42.6 |
| Silica | 42.6 |
| Fluorspar | 3.3 |
| Silico-manganese | 4.4 |
| Sodium silicate (anhydrous) | 7.1 | said ingredients being in finely ground state and agglomerated in uniformly distributed condition into such particles by means of such anhydrous sodium silicate.

9. A flux composition suitable for use in arc welding when deposited as a layer along the line to be welded, such composition being in the form of granular free flowing particles comprising the following ingredients in approximately the indicated percentages, viz.:

| | Per cent |
|---|---|
| Manganese dioxide | 20.3 |
| Iron oxide | 9.8 |
| Alumina | 9.8 |
| Silica | 45.0 |
| Fluorspar | 3.4 |
| Ferro-silicon | 1.1 |
| Sodium silicate (anhydrous) | 10.6 | said ingredients being in finely ground state and agglomerated in uniformly distributed condition into such particles by means of such anhydrous sodium silicate.

10. In a method of making a flux composition suitable for use in arc welding, the steps which comprise intermixing dry, finely ground flux ingredients with water glass solution, said ingredients being selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica, in approximately combining ratio, and the amount of water glass being approximately the minimum required to agglomerate said ingredients, then drying the resulting mass to render the same substantially anhydrous, and reducing the dried mass to the form of granular, free flowing particles wherein said ingredients are bonded together in uniformly distributed condition by dry water glass.

11. In a method of making a flux composition suitable for use in arc welding, the steps which comprise intermixing dry, finely ground flux ingredients with water glass solution, said ingredients being selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica in approximately combining ratio, and including a relatively small amount of a killing agent, and the amount of water glass being approximately the minimum required to agglomerate said ingredients, then drying the resulting mass to render the same substantially anhydrous, and reducing the dried mass to the form of granular, free flowing particles wherein said ingredients are bonded together in uniformly distributed condition by dry water glass.

12. In a method of making a flux composition suitable for use in arc welding, the steps which comprise intermixing dry, finely ground flux ingredients with water glass solution, said ingredients being selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica in approximately combining ratio, and including a relatively small amount of a metallic fluoride selected from the class consisting of calcium, sodium and aluminum fluorides, and the amount of water glass being approximately the minimum required to agglomerate said ingredients, then drying the resulting mass to render the same substantially anhydrous, and reducing the dried mass to the form of granular, free flowing particles wherein said ingredients are bonded together in uniformly distributed condition by dry water glass.

13. In a method of making a flux composition suitable for use in arc welding, the steps which comprise intermixing dry, finely ground flux ingredients with water glass solution, said ingredients being selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica, the amount of water glass being approximately the minimum required to agglomerate said ingredients, then heating the resulting mass short of the melting point of said ingredients to render the same substantially anhydrous, and grinding the dried mass to the form of granular, free flowing particles wherein said ingredients are bonded together in uniformly distributed condition by dry water glass.

14. In a method of making a flux composition suitable for use in arc welding, the steps which comprise intermixing dry, finely ground flux ingredients with water glass solution, said ingredients being selected from the class consisting of manganese, calcium, magnesium and aluminum silicates and of silicate forming components, namely manganese oxide and silica and calcium, aluminum, titanium and iron oxides and calcium and calcium magnesium carbonates together with manganese oxide and silica in approximately combining ratio, and the amount of water glass being approximately the minimum required to agglomerate said ingredients, then heating the resulting mass at from 700° F. to 1200° F. until substantially anhydrous, and grinding the dried mass to the form of granular, free flowing particles wherein said ingredients are bonded together in uniformly distributed condition by dry water glass.

GEORGE G. LANDIS.
VLADIMIR PETERS.

REFERENCES CITED

The following references are of record in the file of this patent:

UNITED STATES PATENTS

| Number | Name | Date |
|---|---|---|
| 496,116 | Gale | Apr. 25, 1893 |
| 1,754,566 | Miller | Aug. 15, 1930 |
| 2,010,695 | Lair | Aug. 6, 1935 |
| 2,065,157 | Stine | Dec. 22, 1936 |
| 2,141,316 | Roberts | Dec. 27, 1938 |
| 2,308,194 | Miller | Jan. 12, 1943 |
| 2,360,716 | Peters | Oct. 17, 1944 |
| 2,363,876 | La Lande, Jr. | Nov. 28, 1944 |

FOREIGN PATENTS

| Number | Country | Date |
|---|---|---|
| 602,790 | Germany | Sept. 17, 1934 |

Certificate of Correction

Patent No. 2,474,787                                           June 28, 1949

GEORGE G. LANDIS ET AL.

It is hereby certified that error appears in the printed specification of the above numbered patent requiring correction as follows:

Column 3, line 16, for "12 x 12 mesh" read *12 x 120 mesh*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*